United States Patent [19]

Maxson

[11] Patent Number: 5,156,738
[45] Date of Patent: Oct. 20, 1992

[54] APPARATUS FOR UNIFORMLY DISTRIBUTING GAS AND/OR LIQUID IN AN UNDERDRAIN LATERAL SYSTEM

[75] Inventor: Richard C. Maxson, Maple Grove, Minn.

[73] Assignee: Johnson Filtration Systems Inc., New Brighton, Minn.

[21] Appl. No.: 718,954

[22] Filed: Jun. 21, 1991

[51] Int. Cl.$^5$ .............................................. B01D 24/26
[52] U.S. Cl. ................................. 210/274; 210/279; 210/289; 210/291; 210/293
[58] Field of Search ............... 210/274, 275, 279, 289, 210/291–293

[56] References Cited

U.S. PATENT DOCUMENTS

| | | | |
|---|---|---|---|
| 801,810 | 10/1905 | Parmelee | 210/275 |
| 1,871,122 | 8/1932 | Kretzschmar | 210/293 |
| 4,065,391 | 12/1977 | Farabaugh | 210/293 |
| 4,096,911 | 6/1978 | Geske | 166/234 |
| 4,214,992 | 7/1980 | Sasano et al. | 210/274 |
| 4,331,542 | 5/1982 | Emrie | 210/794 |
| 4,435,286 | 3/1984 | Louboutin et al. | 210/116 |
| 4,604,197 | 8/1986 | Louboutin et al. | 210/150 |
| 4,707,257 | 11/1987 | Davis et al. | 210/274 |
| 5,015,383 | 5/1991 | Evans et al. | 210/497.1 |
| 5,019,259 | 5/1991 | Hambley | 210/275 |

FOREIGN PATENT DOCUMENTS 54141 10/1890 Fed. Rep. of Germany ...... 210/293

OTHER PUBLICATIONS 8 page brochure #UD0690 from Johnson Filtration Systems Inc. entitled "Johnson Underdrain Systems", Jun. 17, 1990.
4 page Bulletin ASU-100 from The F. B. Leopold Company entitled "Universal Underdrain", copyright 1987.
Brochure "Triton Underdrain Systems", pp. 1-4, 1991 AWWA Convention, CPC Engr Corp., Johnson Filtration Systems Ltd., Jun. 23, 1991.

*Primary Examiner*—Robert A. Dawson
*Assistant Examiner*—Joseph Drodge
*Attorney, Agent, or Firm*—Barry L. Clark

[57] ABSTRACT

Underdrain lateral system, which is especially adapted for use in a gravity filter bed, includes, as its preferred embodiment, scallop-shaped laterals having an upper, wrapped wire, slotted screen surface. The screen surface supports and retains the filter media particles directly, without the necessity of an underlying gravel layer, and is itself supported by channel-shaped rod members which are welded to the wires. The web portions of the channel rods perform the function of simultaneously distributing air and water during backwashing, and include small apertures in upper channels and larger apertures in lower channels to cause a plenum to be formed inside the laterals which ensures that the distribution of air and water will be uniform throughout the lateral, even if the lateral is not perfectly level. Distribution of the air and water throughout all of the laterals is made even more uniform by mounting the laterals on a header and providing perforated flow tubes which extend from each lateral into the header to produce an additional air plenum therein.

20 Claims, 3 Drawing Sheets

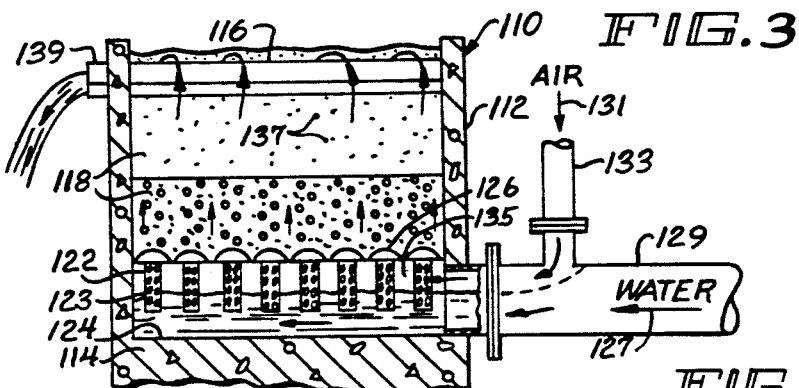
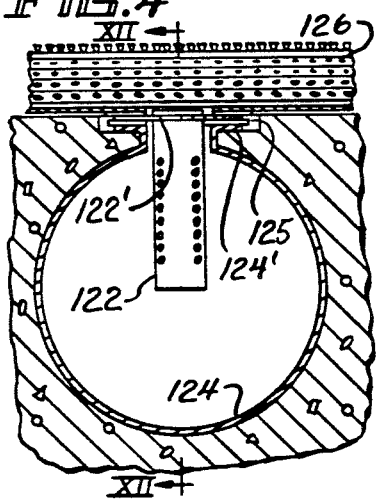
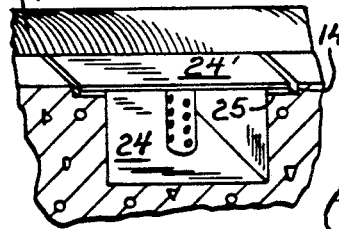
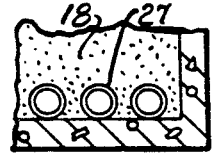
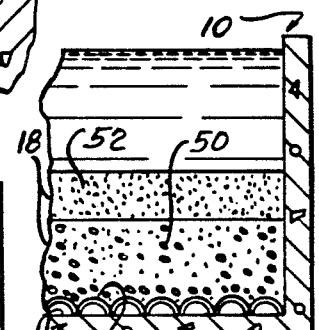
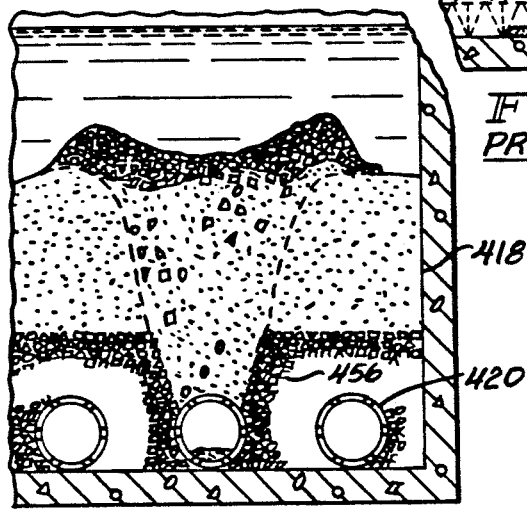
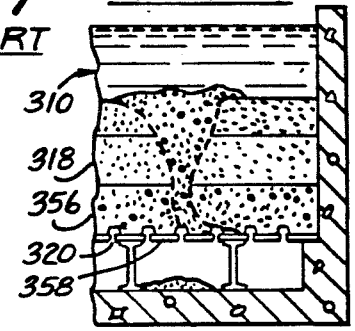

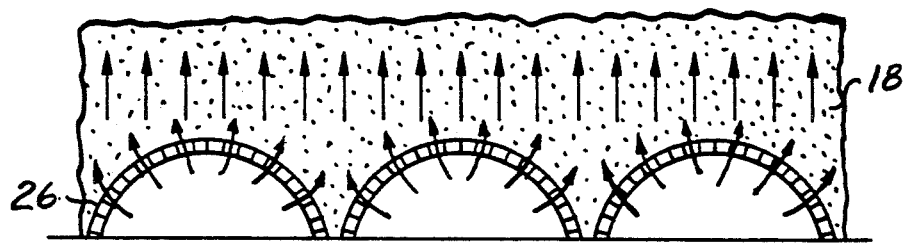
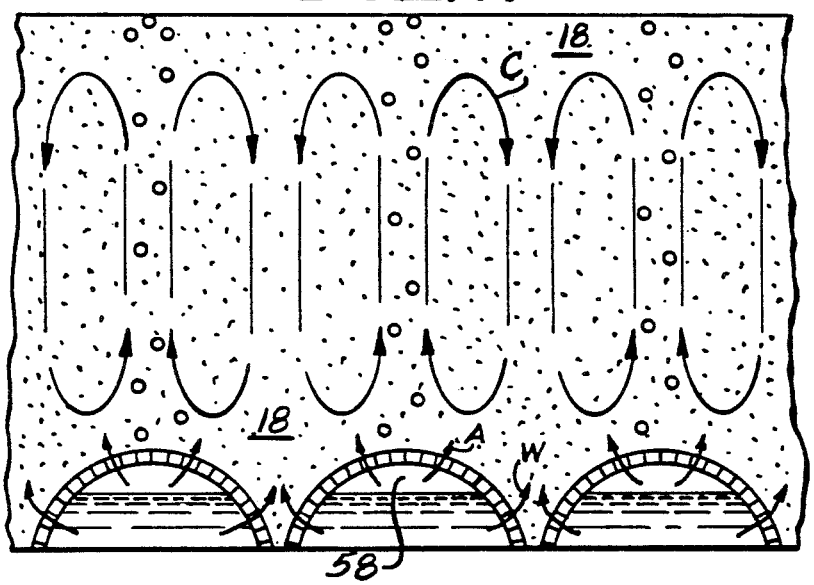
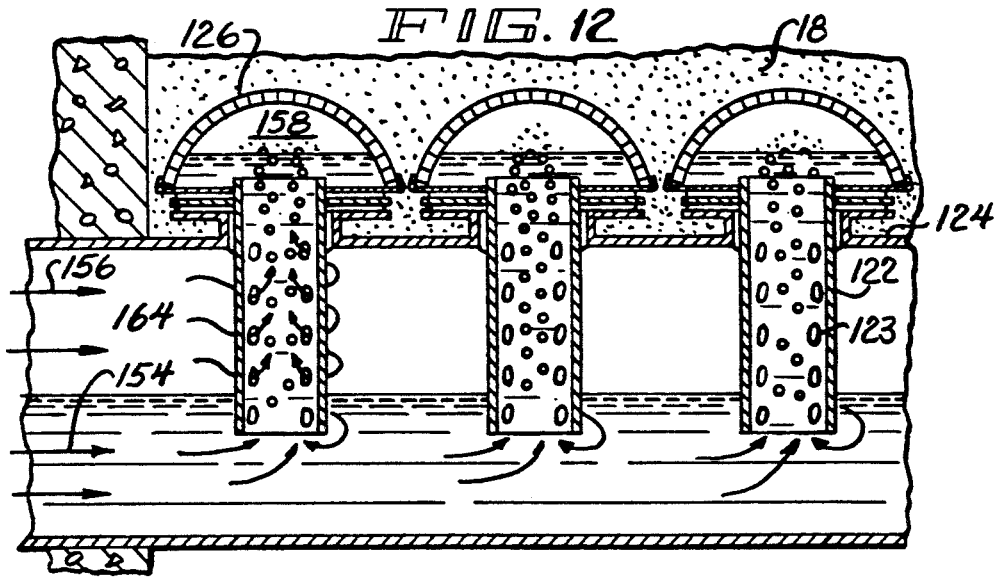

APPARATUS FOR UNIFORMLY DISTRIBUTING GAS AND/OR LIQUID IN AN UNDERDRAIN LATERAL SYSTEM

BACKGROUND OF THE INVENTION

This invention relates to the distribution of air or other gas within a body of liquid, and more particularly, within a gravity filter. The use of air to backwash gravity filters is becoming more common in the water treatment industry in the United States. On the other hand, air backwashing has been used in Europe for several decades. Based on the experiences of these European facilities, water treatment engineers have found that a filter bed can be more effectively cleaned through the use of air, rather than with water alone.

A typical backwash sequence using only water consists of a high velocity, reverse flow through the filter bed for a relatively long period of time. Typical backwash flow rates are in the range of 15-20 GPM/ft$^2$ (gallons per minute per square foot). This compares to a normal filtering flow rate (downward) of 3-5 GPM/ft$^2$. This water backwash, depending upon the solids loading in the raw water, is done once every one or two days and lasts from 10-20 minutes.

Air backwashing sequences typically follow two basic patterns. The first involves a cycle of air backwash at a flow rate of around 2-4 SCFM/ft$^2$ (standard cubic feet per minute per square foot) for about five minutes. This backwash using only air is then followed by a shortened water backwash for about five minutes at the aforementioned flow rate of 15-20 GPM/ft$^2$.

A second approach is to include a simultaneous air/water cycle between the separate air and water cycles listed above. Rates for these simultaneous flows are typically 2-4 SCFM/ft$^2$ and 3-5 GPM/ft$^2$. Duration of this simultaneous flow cycle is around five minutes. When this approach is used, the duration of the final cycle using only water can be further shortened to around five minutes.

A calculation of the total water used for backwash shows that, with the aforementioned second approach, water usage can be reduced from 150-400 gallons/ft$^2$ using only a water backwash cycle, to about 90-125 gallons/ft$^2$, a significant decrease. Additionally, the filter bed is usually better cleaned with the incorporation of an air backwash, resulting in longer filter runs between backwashes. These longer runs further reduce the net usage of water for backwashing. There is an obvious economic advantage to this process and, consequently, it is becoming more common.

The common method of underdrain design in Europe involves the use of hundreds or thousands of individual, direct retention filter nozzles placed in a false floor. This false floor is generally about 12" above the true filter floor and provides a chamber for flows to be collected during filtering and distributed during backwash. Distribution of water in such a system is accomplished relatively easily by limiting the flow area through the connection point between each nozzle and the floor. This limited flow area introduces a pressure drop which tends to make the water flow towards all of the nozzles rather than be concentrated in just some of the nozzles. However, if air is also to be distributed, additional design problems are introduced. The designers of these systems which utilize air during backwash, realized that air, because it is much less dense than water, would see very little pressure drop through a nozzle connection point designed to distribute water. Hence, air introduced into such a system would tend to all exit through the first few nozzles that it encountered. If, on the other hand, one sized the nozzle connection openings small enough to provide an even distribution of air, then the pressure drop encountered during water flow would be unacceptably high. A means of "pre-distributing" the air flow was needed.

This pre-distribution is typically accomplished through the incorporation of "drop-tubes" in the connection point of each nozzle. Such tubes are typically about 6" long and are open on the lower end. Their diameter is the same as that of the connection point. These drop-tubes have either a slot or a series of small holes in the wall of the tube, forming side openings which do not extend all the way up to the nozzle, but start at a defined elevation below the nozzle. This placement allows the formation of an air "plenum" which distributes air throughout the entire underside of the false floor before air can begin to exit any of the side holes in the drop tube. As more air is introduced into the system, the elevation of the air/water boundary continues to decrease until a balance is achieved between the total air flow out of all of the drop-tube orifices and the air flow into the system. By using tubes of the type described, simultaneous air/water distribution is possible since water can flow through the open end of the air tubes without disrupting the plenum.

The disadvantages of the type of system just described are its expense, the need to provide a structurally sound false floor, the fragility of the individual nozzles which are usually plastic, and the difficulty of retrofitting such a system into existing header/lateral type filters.

An alternate method of incorporating air into a filter is to install an independent air distribution system, such as a drilled pipe header lateral. However, such an approach is quite expensive and also requires the placement of the air distributors above the graded support gravel common to many filters. If such a distributor were placed below the gravel, it would normally cause uplifting and disruption of the gravel layers, resulting in a shortened filter bed life.

Yet another method of incorporating air distribution is one in which a separate air distributor section is incorporated within an underdrain "lateral" which takes the form of a block. Since the design is relatively complex, the cost of such an underdrain is relatively high. Also, such a design requires the use of graded gravel above the block. Although the stability of the gravel can be fairly well controlled by maintaining a limited air flow rate, gravel disruption is still a problem with this design.

One example of a patented prior art construction is Parmellee U.S. Pat. No. 801,810 which has small upper apertures on a single upper level to distribute air into a bed of coarse gravel, and large lower apertures on a single level to distribute water. Sasano et al U.S. Pat. No. 4,214,992 is similar to Parmalee in that it has air orifices at a single level and does not appear to address simultaneous air/water backwash. Davis et al U.S. Pat. No. 4,707,257 shows air and water orifices in the same chamber and at the same elevation, thus making the unit sensitive to levelness. It incorporates dual plenums, with one air plenum being located under a false floor and the other under a flat distribution plate containing small segments of screen for supporting the filter media. Evans et al U.S. Pat. No. 5,015,383, and co-pending Division Ser. No. 698.900, filed May 13, 1991, which are assigned to a common assignee, and are hereby incorporated by reference, show scallop-shaped underdrain laterals in FIGS. 7 and 15-17 which include internal distribution members. The perforations which are disclosed in the internal distribution members are sized to accommodate water flows, and thus would not distribute air uniformly if the lateral were other than perfectly level. For example, the distribution pipes disclosed in FIGS. 15 and 16 have openings only in their lower surface. This arrangement would produce a plenum if air was introduced, but the air would all tend to flow out of the holes at the higher end of the lateral.

SUMMARY OF THE INVENTION

It is among the objects of the present invention to provide a means for accomplishing air, water and air-/water backwash distribution within an underdrain lateral system that does not require the use of a separate air distributor, but rather, can introduce the air at the underdrain level. It is another object of the invention to provide an underdrain system which will support the media bed directly without the need for an underlying gravel bed. Yet another object is to provide a lateral system which will allow an "air plenum" to be developed which will ensure that water flows can be distributed evenly without excessive pressure loss. A still further object is to provide an underdrain lateral system which will permit simultaneous distribution of air and water without undue pressure loss and without disruption of the uniformity of either water or air flow distributions.

The foregoing and other objects are achieved by the apparatus of the present invention in which a distributor member is provided which includes a porous, media retaining portion having an open area of a first predetermined size through which said backwash liquid and backwash gas can pass upwardly into said media bed during a backwashing operation. The distributor member further includes an enclosed flow distributing portion which, when viewed in a cross-section taken normal to the axis of said distributor member, has an outer surface which contains a plurality of openings positioned at multiple vertical levels which are adapted both for use in a collection mode for collecting a liquid filtrate which has passed downwardly through said porous, media retaining portion and, in a backwash mode, for ejecting said backwash liquid and backwash gas outwardly therefrom and into contact with said media. The plurality of openings in the flow distributing portion have an open area of a second predetermined size which is considerably less than the open area of the first predetermined size of the porous, media retaining portion. Further, the plurality of openings in the flow distributor portion are positioned at multiple vertical levels consisting of a first plurality of upper openings which are sized and spaced along the length of the distributor member for the relatively uniform ejection of the backwash gas and a second plurality of lower openings which are sized and spaced along the length of the distributor member for the relatively uniform ejection of the backwash liquid. The first plurality of upper openings are positioned in multiple vertical levels which extend downwardly from the top of the said outer surface and from each other by a distance of at least one inch, while the second plurality of lower openings are positioned at at least one vertical level which is located at or above the bottom of the said outer surface, said first plurality of upper openings having a total open area which is considerably less than the total open area of said second plurality of lower openings.

By forming and locating the various gas and liquid openings as described, only a limited volume of air will be able to exit the perforations on the very top of the tube, thus forcing the remaining air to form a plenum and be distributed along the length of the lateral.

By having the perforations at multiple levels, more air will be able to exit per length of lateral as the plenum height increases. This will result in the plenum stabilizing at some height which is dependent upon the total air volume introduced into the lateral. Distribution uniformity is dependent upon the total number of perforations "uncovered" per length of lateral and is much less dependent upon levelness than would be true of the design shown in U.S. Pat. No. 5,015,383.

By proper selection of hole sizes and spacings to achieve desired flow rates for air and water, the height of the plenum will stabilize at a level which is above that of the larger water distribution holes.

Although it is preferred that small perforations be placed in the upper levels of the internal flow distributing portion and large perforations at the bottom of said portion, it would also be possible to utilize other arrangements, including for example, a gradation of perforation sizes from very small on the top to very large on the bottom. It should be noted, however, that the size of the perforation is not important, but the total perforation area is. Therefore, one could accomplish limited perforation area by either maintaining the same number of holes, but with smaller diameter, or maintaining the same diameter of holes, but reducing the quantity.

BRIEF DESCRIPTION OF THE DRAWINGS

FIG. 3 is a schematic, side elevational view showing the flow paths assumed by water and air during the operation of the filter of FIG. 1 in a backwash operation;

FIG. 4 is a fragmentary end elevational view showing a modified form of header member comprising a length of pipe which is cast into the concrete floor of the filter;

FIG. 5 is a fragmentary end elevational view showing a preferred embodiment of a header member whose top comprises a flat plate, and whose sides and bottom are defined by a trough which is integrally formed in the bottom of the filter;

FIGS. 6 and 6A are cross-sectional, side and top elevational views of a filter incorporating scallop-shaped lateral distribution members in accordance with the present invention;

FIG. 7 is a cross-sectional, side elevational view of a prior art filter incorporating filter block elements as lateral distribution members which are located beneath a lower bed of gravel and an upper bed of filter media, and illustrates how the beds can be upset when too much air or water is passed through the relatively large diameter air/water holes which are located in the top surface of the filter blocks;

FIG. 8 is a cross-sectional, side elevational view of a prior art filter incorporating a false bottom and relatively widely spaced flow nozzles as distribution members which are located beneath a lower bed of gravel and an upper bed of filter media, and illustrates how the beds can be upset when too much air or water is passed through the relatively large diameter air/water holes which are located in the top surface of the false bottom;

FIG. 9 is a cross-sectional, side elevational view of a prior art filter incorporating a series of parallel perforated pipe laterals as distribution members which are located beneath a lower bed of gravel and an upper bed of filter media, and illustrates how the beds can be upset when too much air is passed through the relatively large diameter water holes which are located in the surface of the perforated pipe laterals;

FIG. 10 is a fragmentary, schematic, side elevational view of the filter of FIG. 1 showing the uniform upward distribution of water into the media bed during a "water-only" backwash operation;

FIG. 11 is a fragmentary, schematic, side elevational view of the filter of FIG. 1 showing the alternating movement of air and water upwardly into the media bed during an "air/water" or "air-only" backwash operation so as cause recirculation of the media; and FIG. 12 is a fragmentary, cross-sectional view taken on line XII—XII of FIG. 4, illustrating the air plenums which are formed in both the laterals and header during an "air/water" backwash operation.

DETAILED DESCRIPTION OF THE DRAWINGS

Figure 1:
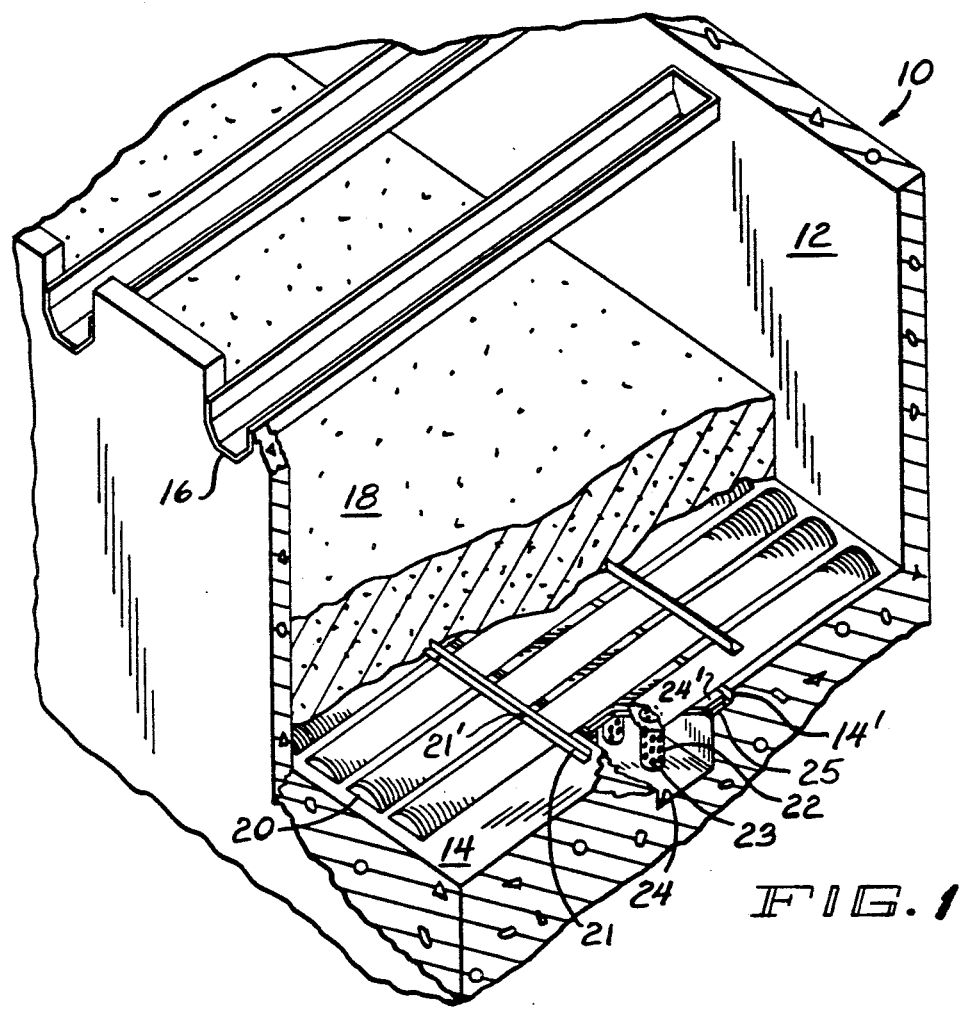
FIG. 1 is a fragmentary, partially broken away, perspective view showing a filter incorporating the underdrain lateral system of the present invention.

Referring to FIG. 1, a filter assembly is indicated generally at 10. The filter includes side walls 12, which are typically constructed of concrete, and a concrete floor 14. Overflow troughs 16 are mounted at spaced locations along the top of the filter for the purpose of distributing liquid, such as raw water, into the filter wherein, during a collection mode, it will pass down through the media bed 18, and be collected by a plurality of distributor members 20. The upper surface of the distribution member is porous, and preferably has perforations such as thin slots which are sized so as to retain the particles which make up the media bed 18. Although the distributor members 20 are shown as being laterals of a scallop-shaped cross-section, they could be of any tubular shape, including cylindrical, for example. During a backwash mode, the overflow troughs 16 collect the water which is directed upwardly through the media bed by the distributor members 20 and direct it to waste. A downwardly extending flow tube 22 is preferably mounted on each distributor member and includes a plurality of openings 23 through which the water can flow into a header member 24, which is shown in the form of a trough formed in the floor 14 which is covered by a plate 24'. The plate 24' is held in sealed relationship to the trough by an elastomeric sealing strip 25 which is located under each side edge of the plate in a recess 14' and fastened to the floor by bolts (not shown). The distributor members 20 are held down by a pair of holddown bars 21 which are fastened to the floor 14 by bolts 21'. Although the flow tube openings 23 are shown as a series of vertically spaced rows of holes, they can be more accurately described as vertically extending opening means, and can take other forms, such as one or more vertical slots, for example.

Figure 2:
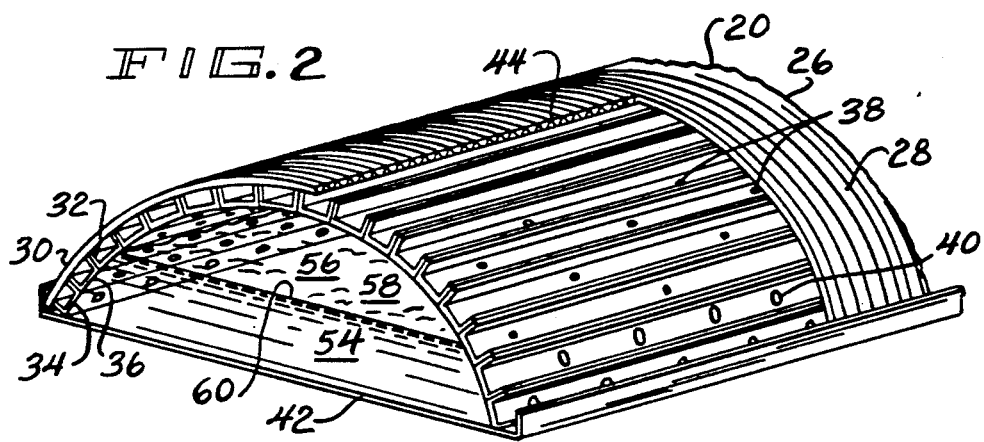
FIG. 2 is a fragmentary, partially broken away, and with one end removed for clarity, perspective view showing a scallop-shaped lateral which represents the preferred construction for providing uniform air and water distribution during backwashing of the filter shown in FIG. 1.

FIG. 2 shows a preferred construction of a distributor member 20, which is in the form of a scallop-shaped lateral member 26. The curved upper surface 28 of the member 26 is preferably a curved screen which is formed by wrapping a wire 30 having a wedge-shaped cross-section around a cylindrical array of channel-shaped rod members 34, and welding the wire to the radially outwardly extending leg portions 32 of the channels at every intersection therewith, as discussed in Geske U.S. Pat. No. 4,096,911. The channel members 34 include web portions 36, various ones of which may either be left blank or provided with openings of various sizes at spaced locations along their length, depending upon the anticipated operating conditions. In order to achieve optimal distribution of both air and water during backwashing, and to render the distributor relatively insensitive to small variations in its vertical position from one of its end to the other, the channels which are located at several upper vertical levels are provided with small openings 38 which are particularly suitable for the passage of air during an air/water backwash operation. Similarly, one or more channels at lower levels are provided with large openings 40 which are suitable for the passage of water. The bottom of the lateral is shown as being covered by an unperforated flat baseplate 42 which causes all of the flow into and out of the distributor to take place through the slot openings 44 between the wires 30. In order to achieve the desired flow conditions during backwash, the total area of the slot openings 44 is substantially greater than the total area of the channel openings 38, 40. When the lower portion of the inside of the lateral is filled with water 54 and the upper portion is filled with air 56, as it would be during a backwash operation, a distributor air plenum 58 is formed between the top of the lateral and the surface level 60 of the water 54. Since the laterals would typically be mounted to a header on 12 inch centers, with the laterals having a width of approximately 11 inches and a height of about 3-4 inches, it is preferred to size the areas of the upper and lower level openings 38, 40 so that, for the desired flow conditions, the plenum 56 will have a height of at least one inch. It is also preferred to have the small upper level openings 38 extend at least some distance below the level 60 of the air/water interface. Although the openings 38, 40 have been described as "small" and "large", the most important factor is that the total area of the upper openings 38 be considerably less than the total area of the lower openings 40 since much less area is needed to accommodate the desired flow of air than is needed to accommodate the desired flow of water. Obviously, it would be possible for all of the openings 38, 40 to be of the same size if the upper openings were spaced much further apart from each other in their respective channels than the lower openings, or if some of the upper channels did not include any openings. However, in order to achieve uniform distribution along the length of the lateral, the use of different hole sizes is preferred. Furthermore, although the holes 38, 40 have been shown as being in rows which are vertically spaced relative to each other, it is contemplated that the desired area of opening could be achieved in other ways, such as by the use of vertical slots having portions thereof which are open at multiple vertical levels. For example, the distributor member 20 could comprise a pipe made of plastic which had a series of thin slots cut into its surface around portions of its periphery in order to provide the desired flow areas for air and water.

FIG. 3 illustrates a backwash operation within a filter 110 having side walls 112, a base or floor 114, overflow troughs 116, a media bed 118, flow tubes 122 having openings 123, a cylindrically shaped header member 124 embedded in the floor 114, as more clearly shown in FIG. 4, and scallop-shaped laterals 126. During a backwash operation, water 127 is injected into water conduit 129 under pressure and enters the hollow tubular header 124 along with air 131 which is injected into air conduit 133. The restricted area of the flow tube openings 123 causes the air to build up a header plenum area 135 which ensures that the air 131 and water 127 will enter the various lateral elements 126 at relatively uniform flow rates along the length of the header. After the air and water enter the laterals, they pass upwardly through the media bed 118 where they agitate and fluidize the media so that the dirt or other particles 137 which have collected on the particles of media in the bed during the collection cycle are moved to the top of the bed and, during the final wash cycle, lifted into the overflow troughs 116 from which they are carried to waste by conduit 139. Although the backwash operation has been depicted and described, the collection operation is generally the reverse. For example, the raw water enters the conduit 139 and falls onto the surface of the media bed 118 from whence it passes into the lateral elements 126 and though the flow tubes 122 into the header 124. It leaves the header through the conduit 129. Appropriate valves, not shown, permit the flow of water and air to take place as desired.

FIG. 4 shows an end view of the cylindrical header 124 whose side is shown in FIG. 3 and illustrates the manner in which it is mounted relative to the flow tube 122 and lateral 126. The flow tube is provided with a flange portion 122' which is positioned between a header flange portion 124' and the bottom of the lateral 126. A mounting gasket 125 is preferably positioned above and below the flange portion 122' in order to seal the tube 122 to the lateral and to the header.

FIG. 5 illustrates a trough-shaped header 24 of the type shown in FIG. 1 and shows how the filter floor 14 has a recess 14' for receiving the cover plate 24' and an elastomeric sealing strip 25. The tube 22 would be mounted relative to the lateral 26 in the manner shown in FIG. 4.

FIGS. 6-9 are cross-sections which illustrate the principal differences between the flow distribution system of the present invention, which is shown in FIG. 6, and several prior art arrangementw which are shown in FIGS. 7-9. FIG. 6 includes a filter 10 having a floor 14 on which the scallop-shaped laterals 26 rest. The media bed 18, which rests upon, and is supported by the laterals 26, is shown as being a dual media bed, which might include, for example, sand particles 52 in its lower level and coal particles 50 in its upper level. The bed could also be a "mixed media" bed with 3 or 4 different types of particles arranged at different levels. In a 3 layer bed, the top layer would generally be coal, the middle layer, silica sand, and the lower level, garnet or ilmenite. The layers have lighter density particles as they go up, and thus, even though the bed is agitated and caused to circulate during the air/water backwash cycle, the particles which are originally loaded into the various layers will tend to return to their original layers during the final "water only" cycle. FIG. 6-A is similar to FIG. 6 but shows that the distributor member of the present invention could be other than scallop-shaped, and could thus be made as a cylindrically-shaped screen member 27. The prior art designs illustrated in FIGS. 7-9 all have air/water or water exit openings which are sufficiently large as to require the presence of a layer of gravel 256, 356, 456 between the exit openings and the media bed 218, 318, 418. The gravel layers and the media layers must be very carefully positioned when they are originally loaded into the filter, and are subject to being disrupted or upset if the pressures and flow rates for the injection of air and water is not very carefully controlled. As can be seen in the figures, an upset will cause gravel to move upwardly and allow the media to move downwardly to take the place of the displaced gravel. The media can then enter the distributor member and block it, or can render the filter ineffective by allowing too much water to leave the unit in the region of the upset without being filtered in a uniform fashion. Also, media could be lost, and the lost media could contaminate the collected water. The various filter arrangements shown include the block type distributor 220 shown in the filter 210 of FIG. 7 in which a large number of distributor blocks are positioned on the floor 214 of the filter so that the top surfaces of the blocks will form a false floor for supporting the layer of gravel 256. Although this design has a central, generally triangular tube portion with apertures at two levels for allowing an air plenum to form and to allow the air to exit at one level and the water at another, the air and water leave the block together through relatively large holes in the top surface of the block. FIG. 8 shows a filter 310 which has a large number of spaced apart distributor caps or nozzles 320 mounted on a false floor 358 under which an air plenum can form. This design, as would be true in the case of the block design of FIG. 7, requires a significant amount of vertical space between the floor 314 of the filter and the bottom of the media bed 318 and thus, as compared to the design of FIG. 6, requires either a filter housing with higher side walls to accommodate a media bed of the same height, or a media bed of less height for the same size filter. FIG. 9 is drawn somewhat out of scale compared to the other figures since the height of the media bed 418 is shown as having very little height compared to the distributor pipe 420 in order to better clarify the action that takes place during a bed upset when gravel from layer 456 travels up to the top of media bed 418. The distributor pipe 420 is typical of a "water only" system. Since the pipes 420 are relatively widely spaced, as are the caps or nozzles 320 in FIG. 8, it is obvious that such systems will not be able to provide a uniform upward flow of backwash fluid, and "dead spots" will develop between the distributors which will not get satisfactorily cleaned during backwashing. The wide spacing can also result in portions of the media bed between the distributors not being active during the collection mode.

FIGS. 10 and 11 are intended to illustrate the manner in which the upward flow of backwash fluids takes place from three lateral members 26. In FIG. 10, which represents a "water only" cycle, water will move upwardly through all of the openings (38, 40 in FIG. 2), as indicated by the lower arrows, and will move relatively uniformly upwardly into the media bed 18, as indicated by the upper arrows. In FIG. 11, which represents a combined air/water cycle, a distributor air plenum 58 will be formed, with the result that air will travel straight up into the media bed 18 from the upper openings 38 (FIG. 2), as indicated by arrows "A", while water will travel upwardly from the lower openings 40 (FIG. 2), as indicated by arrows "W". Since the air will be moving faster, it will cause the media particles to move upwardly in the regions directly over the laterals and then drop down in the regions between the laterals. This will cause a circulation of the media particles as indicated by the upper arrows "C".

FIG. 12 illustrates how dual plenums are formed during backwash to provide better distribution of both air and water in the header and laterals. The laterals 126 are attached to the header member 124 in the manner shown in FIG. 4 and are connected by flow tubes 122 having openings 123. The openings 123 are of a sufficiently small area that they will produce a back pressure which will cause pressurized air 156 to force the level of pressurized water 154 down so as to form a header plenum 164. The air 156 will travel upwardly into the laterals 126 through the openings 123 and the flow tubes 122, and will be accompanied by water 154 which will travel upwardly through the bottom opening in each of the tubes 122. When the air and water are in the laterals they will encounter the resistance of the small area of upper openings 38 (FIG. 2) and the larger area of lower openings 40 (FIG. 2) to produce a distributor air plenum 158 which will distribute air and water into the bed 18 as shown in FIG. 11.

An example of an actual underdrain lateral system made in accordance with the invention can be described as follows: A series of 32 laterals of the scallop shape shown in FIG. 2, and a length of 128", were mounted to a 20" diameter header pipe on 12" centers and placed in the bottom of the filter. A mixed media bed having a bottom layer of about 6" of fine sand, a center layer of about 12" of coarse sand, and an upper layer of about 18" of coal was then placed in the filter on top of the laterals. The scallops had an outside dimension of 10.75" wide by 4.2" high, and a slot width of 0.010", which provided about a 10% open area since the width of the screen wires was 0.093". The total screen open area per foot of length was 16.0 in$^2$. Seventeen channels inside the screen included thirteen at the top of the screen which were sized for air and four at the bottom sized for water. Each of the thirteen upper channels included 3/32" apertures spaced on 4" centers so as to provide a total air hole flow area per foot of length of 0.269 in$^2$. The four lower channels included 3/16" apertures on 3" centers, providing a total water hole flow area of 0.442" per foot of length. When an air flow of 4 SCFM/ft of lateral (same as 4 SCFM/ft$^2$ of media bed, since the laterals are on one foot centers) and a water flow of 3 GPM/ft of lateral was injected into the laterals, an air plenum was formed which extended about 1.5" from the inside top of the lateral, or about 1.75" up from its bottom plate. The laterals were connected to the header pipe by flow tubes comprising 13" lengths of 3" pipe having 4 columns each of ⅜" apertures which were spaced apart vertically on 1" centers in 8 rows. The total area of the apertures in each flow tube was thus 3.53", which, at flow rates of 1120 SCFM for air, and 840 GPM for water, caused a header air plenum to be produced at a water level of about 14". In its collection mode, the system collected about 4 GPM/ft$^2$. In its "water only" backwash mode, the flow rate was 17 GPM/ft$^2$.

I claim:

1. An underdrain distributor apparatus having at least one elongated distributor member which is adapted to be positioned generally horizontally beneath a bed of granular media which must be periodically backwashed with fluids, including a backwash liquid and a backwash gas, said distribution apparatus including means for receiving a backwash liquid and a backwash gas therein, under pressure, which will produce a vertical plenum space of gas above said liquid, and being characterized in that said distributor member includes a non-planar porous, media retaining portion having a total open area per unit of length of said distributor member of a first predetermined size through which said backwash liquid and backwash gas can pass upwardly into said media bed during a backwashing operation; said distributor member further including an enclosed flow distributing portion which, when viewed in a cross-section taken normal to the axis of said distributor member, has an outer surface which contains a plurality of openings positioned at multiple vertical levels which are adapted both for use in a collection mode for collecting a liquid filtrate which has passed downwardly through said porous, media retaining portion and, in a backwash mode, for ejecting said backwash liquid and backwash gas outwardly therefrom and into contact with said media, said plurality of openings having a total open area per unit of length of said distributor member of a second predetermined size which is considerably less than the said total open area per unit of length of said first predetermined size of said porous, media retaining portion, said plurality of openings which are positioned at multiple vertical levels consisting of a first plurality of upper openings which are sized and spaced along the length of the distributor member for the relatively uniform ejection of the backwash gas and a second plurality of lower openings which are sized and spaced along the length of the distributor member for the relatively uniform ejection of the backwash liquid, said first plurality of upper openings having portions thereof which are open at multiple vertical levels, and at least some of which extend downwardly from an uppermost portion of said outer surface by a distance of at least one inch, said second plurality of lower openings being positioned at at least one vertical level which is located at or above the bottom of said outer surface, said first plurality of upper openings having a total open area per unit of length which is considerably less than the total open area per unit of length of said second plurality of lower openings, said distributor apparatus further comprising an unperforated baseplate.

2. An underdrain distributor apparatus in accordance with claim 1, characterized in that said porous, media retaining portion of said distributor member is a generally tubular-shaped member having a perforated surface portion whose openings are of a sufficiently small size as to retain the granular media.

3. An underdrain distributor apparatus in accordance with claim 2, characterized in that said tubular-shaped member has a generally cylindrical cross-section.

4. An underdrain distributor apparatus in accordance with claim 3, characterized in that at least the perforated surface portion of said tubular-shaped member comprises a segment of slotted screen.

5. An underdrain distributor apparatus in accordance with claim 2, characterized in that said tubular-shaped member has a generally scallop-shaped cross-section which is positioned under said granular media and has a generally flat bottom surface and a generally convexly curved upper surface which is adapted to directly support said granular media.

6. An underdrain distributor apparatus in accordance with claim 5, characterized in that the convexly curved upper surface portion of said tubular-shaped member comprises a segment of slotted screen.

7. An underdrain distributor apparatus in accordance with claim 2, characterized in that at least the perforated surface portion of said tubular-shaped member comprises a segment of slotted screen.

8. An underdrain distributor apparatus in accordance with claim 2, characterized in that said flow distributing portion of said distributor member is positioned interiorly of said tubular-shaped member.

9. An underdrain distributor apparatus in accordance with claim 8, characterized in that said flow distributing portion of said distributor member has a generally tubular-shaped cross-section.

10. An underdrain distributor apparatus in accordance with claim 9, characterized in that said distributor member is one of a plurality of lateral members attached to a header member via a communication port through which said fluids can pass.

11. An underdrain distributor apparatus in accordance with claim 10 characterized in that a flow tube extends downwardly through said communication port from each of said lateral members, said flow tube extending from the interior of said flow distribution portion of said distributor member into the interior of said header member.

12. An underdrain distributor apparatus in accordance with claim 11 characterized in that said flow tube is open at its bottom and includes vertically extending opening means in its side wall which are located interiorly of said header member.

13. An underdrain distributor apparatus in accordance with claim 9 characterized in that said first plurality of upper openings which have portions thereof which are open at multiple vertical levels within the upper portion of said distributor member have a sufficiently small total area that they will exert a back-pressure on backwash gas injected into said distributor member, thereby causing the formation of a distributor plenum and ensuring that said backwash gas will be distributed rather uniformly from one end of the distributor member to the other, even when the distributor member is not completely level, said arrangement of said first plurality of upper openings and said second plurality of lower openings also permitting backwash gas and liquid to be separately distributed at horizontally spaced locations across the width of said flow distributing portion so that said gas and liquid will flow upwardly into the media bed at spaced locations along the width of the distributor member, thereby fluidizing the bed of granular media and causing a circulation of the media.

14. An underdrain distributor apparatus in accordance with claim 13 characterized in that said distributor member is one of a plurality of lateral members, each of which is attached to a header member via a communication port through which said fluids can pass, a flow tube extending downwardly through said communication port from each of said lateral members, said flow tube extending from the interior of said flow distribution portion of said distributor member into the interior of said header member, said flow tube being open at its bottom and including vertically extending opening means in its side wall which are located interiorly of said header member, said vertically extending opening means in the wall of said flow tube having a sufficiently small area that they will exert a back-pressure on backwash gas injected into said header member, thereby causing the formation of a header plenum in said header member, and ensuring that said backwash gas will be distributed rather uniformly from one end of the header member to the other, even when the header member is not completely level, said arrangement of distributor and header plenums serving to make the flow of backwash gas and water more uniform than with either plenum alone.

15. An underdrain distributor apparatus in accordance with claim 8, characterized in that said flow distribution portion of said distributor member is integrally attached to an inside wall portion of said tubular-shaped member.

16. An underdrain distributor apparatus in accordance with claim 15, characterized in that the outer surface of said flow distributing portion of said distributor member is defined by the web portions of a plurality of adjacent, elongated, channel-shaped members which have radially outwardly extending leg portions which are integrally attached to the inside wall of said tubular-shaped member.

17. An underdrain distributor apparatus in accordance with claim 16, characterized in that said porous, media retaining portion has its openings formed by a plurality of parallel, closely spaced wires, the leg portions of said channel-shaped members being welded to said wires and comprising the support for the inside wall of said tubular-shaped member.

18. An underdrain distributor apparatus in accordance with claim 17, characterized in that at least a substantial number of said web portions of said plurality of adjacent, elongated, channel-shaped members which define said outer surface of said flow distributing portion of said distributor member contain openings positioned at spaced locations along their length, said openings comprising said first plurality of upper openings and said second plurality of lower openings.

19. An underdrain distributor apparatus in accordance with claim 18 characterized in that those of said first plurality of upper openings in the channel-shaped members which have portions thereof which are open at multiple vertical levels within the upper portion of said distributor member have a sufficiently small total area that they will exert a back-pressure on backwash gas injected into said distributor member, thereby causing the formation of a distributor plenum and ensuring that said backwash gas will be distributed rather uniformly from one end of the distributor member to the other, even when the distributor member is not completely level, said arrangement of said first plurality of upper openings and said second plurality of lower openings also permitting backwash gas and liquid to be separately distributed at horizontally spaced locations across the width of said flow distributing portion so that said gas and liquid will flow upwardly into the media bed at spaced locations along the width of the distributor member, thereby fluidizing the bed of granular media and causing a circulation of the media.

20. An underdrain distributor apparatus in accordance with claim 19 characterized in that said distributor member is one of a plurality of lateral members, each of which is attached to a header member via a communication port through which said fluids can pass, a flow tube extending downwardly through said communication port from each of said lateral members, said flow tube extending from the interior of said flow distribution portion of said distributor member into the interior of said header member, said flow tube being open at its bottom and including a vertically spaced extending opening means in its side wall which are located interiorly of said header member, said vertically extending opening means in the wall of said flow tube having a sufficiently small area that they will exert a back-pressure on backwash gas injected into said header member, thereby causing the formation of a header plenum in said header member, and ensuring that said backwash gas will be distributed rather uniformly from one end of the header member to the other, even when the header member is not completely level, said arrangement of distributor and header plenums serving to make the flow of backwash gas and water more uniform than with either plenum alone.

* * * * *